A. G. HODGMAN.

Improvement in Water Course Across Roadways.

No. 124,061.                        Patented Feb. 27, 1872.

Witnesses,
C. F. Brown
S. J. Noyes

Inventor,
Abel G. Hodgman
by H. W. Beadle, Atty.

124,061

UNITED STATES PATENT OFFICE.

ABEL G. HODGMAN, OF LOWELL, MASSACHUSETTS.

IMPROVEMENT IN WATER COURSES ACROSS ROADWAYS.

Specification forming part of Letters Patent No. 124,061, dated February 27, 1872.

SPECIFICATION.

*To all whom it may concern:*

Be it known that I, ABEL G. HODGMAN, of Lowell, in the county of Middlesex and State of Massachusetts, have invented a new and Improved Device for Controlling the Flow of Water upon Side Hills; and I do hereby declare that the following is a full and exact description of the same, reference being had to the accompanying drawing and to the letters of reference marked thereon.

This invention has for its object the production of a simple and effective device for controlling the flow of water upon side-hill roads, and is designed to supersede the raised mounds usually thrown up upon the surface of the road-bed at intervals for checking the rush of water and directing it to the sides, and consists of channel-ways set in the road-bed even with its surface, for conducting the water to the side gutters, as will be fully described hereinafter.

Figure 1:
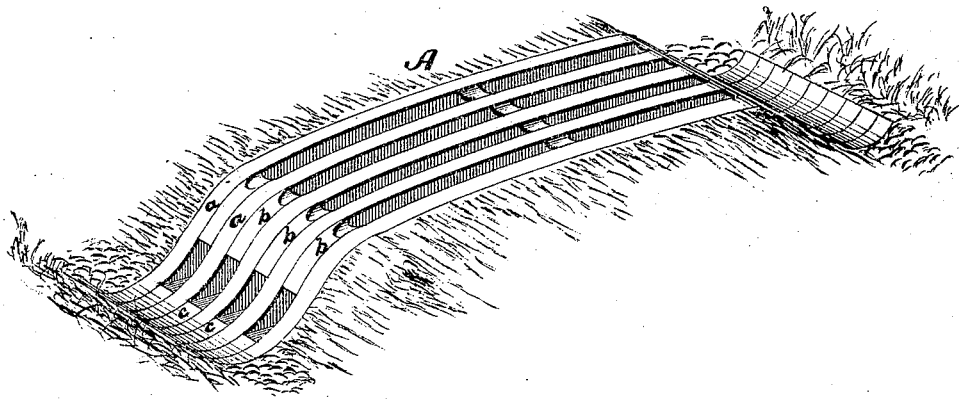
Figure 2:
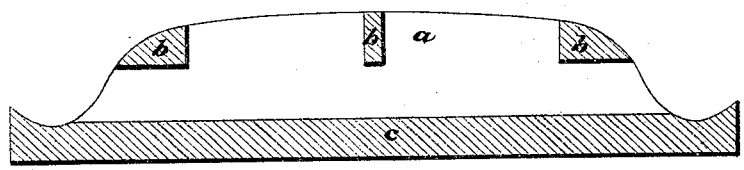
Figure 3:
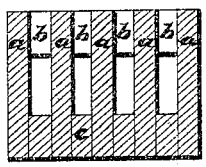

In the drawings, Figure 1 represents a perspective view of my improved device as used upon a hill side. Fig. 2 represents a longitudinal sectional elevation; and Fig. 3, a transverse sectional elevation.

To enable others skilled in the art to make and use my invention, I will now proceed to describe the manner of constructing and using the same.

A represents a series of planks, $a$ $a$, of suitable material and size, which are set into an excavation in the road-bed in such manner that their upper edges are even with its surface. These planks are slightly separated by intervening blocks $b$, care being taken that the distance between the planks is not sufficient to admit the foot of an animal passing over it. Each space between the planks is provided with a bottom-board, $c$, which forms a way for conducting the water to the sides of the road. By means of this device all the water running upon the road-bed will be caught and turned into the gutters at the sides, so that an excessive rush of water is absolutely prevented.

Having thus fully described my invention, what I claim as new, and desire to secure by Letters Patent, is—

The combination of the planks $a$, intervening blocks $b$, and bottom-boards $c$, as and for the purpose set forth.

This specification signed and witnessed this 13th day of December, 1871.

ABEL G. HODGMAN.

Witnesses:
JAMES W. BRADFORD,
WILLIAM H. WOOD.